United States Patent [19]

Spirig

[11] 4,133,291
[45] Jan. 9, 1979

[54] APPARATUS FOR FLUX COATING METAL WICK

[76] Inventor: Ernst Spirig, Mövenstrasse 37, CH8640 Rapperswil, Switzerland

[21] Appl. No.: 863,358

[22] Filed: Dec. 22, 1977

Related U.S. Application Data

[62] Division of Ser. No. 681,843, Apr. 30, 1976, Pat. No. 4,081,575.

[51] Int. Cl.² .............................................. B05C 3/12
[52] U.S. Cl. ...................................... 118/50; 118/74; 118/634; 228/40
[58] Field of Search ....................... 118/50, 68, 620, 74, 118/634, 621; 427/318, 350; 228/40, 43

[56] References Cited

U.S. PATENT DOCUMENTS

| 2,797,173 | 6/1957 | Keller | 118/68 X |
| 3,627,191 | 12/1971 | Hood, Jr. | 228/35 X |
| 3,741,155 | 6/1973 | Hunder | 118/634 |
| 3,887,720 | 6/1975 | Jackson | 118/68 X |
| 3,895,603 | 7/1975 | Barough et al. | 118/50 |

*Primary Examiner*—John McIntosh
*Attorney, Agent, or Firm*—Lawrence E. Laubscher

[57] ABSTRACT

A metal wick to be used for the absorption of molten solder is deoxidized and flux coated by a process that does not involve the application of heat to the wick or the flux. In one embodiment the wick is cleaned by heating in a reducing atmosphere and is then immersed in a coating bath containing a solution of a rosin flux in an organic solvent. On leaving the bath the welted wick enters a low-pressure chamber in which the solvent rapidly evaporates at room temperature. In another embodiment the deoxidized wick is coated with comminuted solid resin by electro-static means.

2 Claims, 3 Drawing Figures

APPARATUS FOR FLUX COATING METAL WICK

This is a division, of application Ser. No. 681,843, filed Apr. 30, 1976, now U.S. Pat. No. 4,081,575.

BACKGROUND OF THE INVENTION

1. Field of the Invention

This invention relates to an improved method for the manufacture of solder-absorbent wick made of metal strands.

2. Description of the Prior Art

In a known method of manufacturing such wicks, which is described in U.S. Pat. No. 3,627,191, the wick is formed by a braid of metal wire, usually copper, is coated with a solution of a solid flux in a volatile solvent and the coated braid is heated to evaporate the solvent and leave a thin coating of the solid flux upon the wires of the braid. It is a disadvantage of this known method that a rosin solution will attack metal with which it is in contact and that the rate of attack is obviously increased with temperature. Thus heating of the solution-coated wick will produce an increased rate of chemical attack by the coating solution upon the coated wick.

SUMMARY OF THE INVENTION

It is an object of the present invention to provide apparatus for the manufacture of flux-coated metal wick that does not involve raising the temperature of the wick or the flux.

It is also an object of the invention to provide apparatus for the manufacture of flux-coated metal work wherein volatile solvent in a solution of fluxing material that has been applied to the wick is rapidly evaporated without raising the temperature of the wick or the flux coating by introducing the wetted wick into an enclosure in which a lowered air pressure exists.

It is an alternative object of the invention to provide apparatus for the manufacture of a flux-coated metal wick wherein comminuted fluxing material is coated upon the wick by electro-static means.

It is a further object of the invention to provide an apparatus for coating a flux coating upon a metal wick, wherein said wick is led in succession through a deoxidizing chamber, a bath containing a solution of a fluxing material in a volatile solvent and a partially evacuated chamber in which the solvent is evaporated from the wetted wick.

It is an alternative further object of the invention to provide an apparatus for coating a flux coating upon a metal wick wherein said wick is led in succession through a deoxidizing chamber and through a chamber into which comminuted fluxing material at an electrical potential differing substantially from that of the wick is introduced to form a coating upon the wick.

DESCRIPTION OF THE PREFERRED EMBODIMENTS

Figure 1:
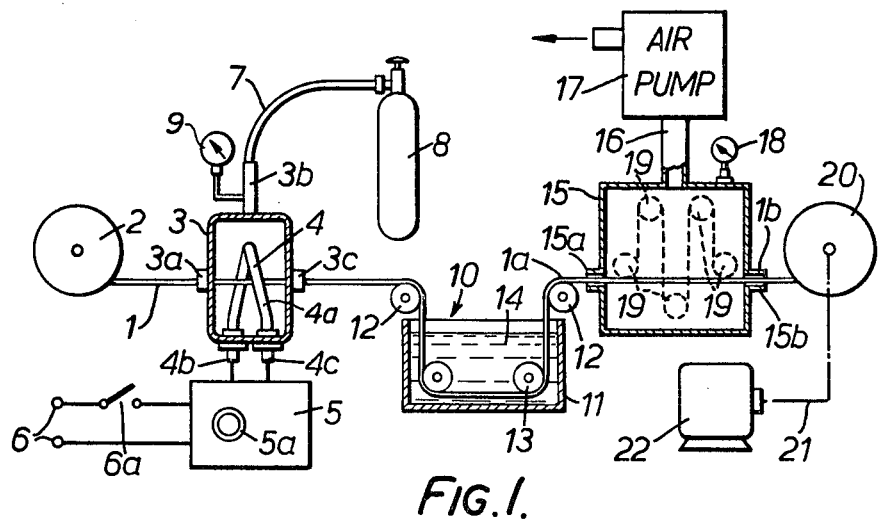
FIG. 1 is a schematic diagram illustrating an embodiment of apparatus for carrying out the invention.

One manner of manufacturing resin-coated metal wick in accordance with the invention is illustrated by FIG. 1 of the drawing. A metal wick 1 is drawn from supply spool 2 to pass into an enclosure through an entry seal 3a of known kind allowing relatively unhindered movement of the wick into the chamber while offering substantial resistance to the flow of gas out of the chamber. Within chamber 3, wick 1 passes into a heating means 4, conveniently as shown an electrical induction heater. In the illustrated embodiment, heating means 4 comprises a rigid single-turn induction coil 4a of which the ends are connected to terminal members 4b, 4c passing through the wall of enclosure 3 and electrically insulated therefrom. Heater coil 4a is connected to a known high-frequency source 5 providing current at a frequency in the range from ten to several hundred kHz, which provides a current of which the amplitude may be varied by a control 5a. Source 5 is fed from an alternating current supply, represented by terminals 6, by way of a switch 6a.

Chamber 3 is provided with a tubulation 3b which is coupled through a tube 7 to a supply of reducing gas represented by gas cylinder 8. Conveniently hydrogen is supplied as the reducing gas to chamber 3 to produce therein a reducing atmosphere which acts on the heated wick 1 to remove oxides and other impurities from its surfaces and thus provide clean metal surfaces for coating. The flow of reducing gas from source 8 into chamber 3 is controlled by suitable means, for example and as shown a valve 8a. The correct atmospheric conditions within chamber 3 may be monitored by suitable known means, here indicated as a presence gauge 9 though other arrangements, such as flow-rate indicating means, may be used if preferred.

The deoxidized wick leaves the chamber 3 through an outlet seal 3c and passes into a coating bath 10 in which it is immersed in a solution of rosin in a suitable organic solvent. Coating bath 10 is shown as comprising a container 11 provided with guide pulleys 12 over which the deoxidized wick enters and leaves the bath and submerged guide pulleys 13 under which the wick passes to be held beneath the surface of the coating solution 14 held in container 11.

On leaving coating bath 10, the wetted wick 1a passes into a drying chamber 15 by way of a pressure seal 15a. Chamber 15 is coupled by way of a conduit 16 with an air pump 17 by means of which the air pressure in chamber 15 is reduced substantially below atmospheric pressure. The pressure within chamber 15 may be monitored by a pressure gauge 18. If preferred, wick 1a may be led in an extended path within chamber 15 by means of suitable disposed guide pulleys 19, as indicated in broken line. The low pressure within chamber 15 produces rapid evaporation of the solvent from the wetted wick at room temperature (about 20° C.). Obviously the lower the pressure in the chamber the more rapid will be the drying of the wetted wick, but the pressure is preferably chosen such that the solvent used evaporates at room temperature at a speed that does not impair the continuity of the flux coating. The coated and dried wick 1b passes out of chamber 15 through an outlet pressure seal 15b and is wound upon a take-up spool 20, driven through driving means, indicated only by a chainline 21, by an electric motor 22. Preferably driving means 21 is responsive in known manner to the amount of wick wound upon spool 20 so as to produce a constant linear speed of the wick through the coating apparatus.

It will be understood that evaporation of the solvent produces a reduction of temperature within the drying chamber that, if continued, will cause the process of evaporation to proceed less rapidly. It may therefore be desirable to provide heating means arranged to maintain the interior of the chamber generally at room temperature.

Figure 2:
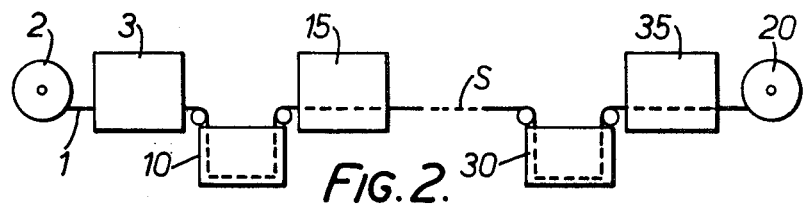
FIG. 2 is a schematic diagram illustrating a modification of the apparatus described with reference to FIG. 1.

It will be understood that this embodiment may be usefully employed to coat a metal wick with other soluble, solid fluxing materials than resin. It will also be understood that the described coating process may be repeated, to apply one or more further coatings of the same fluxing material one or more additional coats of another fluxing material. This is illustrated by FIG. 2 of the drawing in which wick 1 drawn from a spool 2 is deoxidized in a chamber 3 and then passed in succession through a first coating bath 10, a first drying chamber 15, a second coating bath 30 and a second drying chamber 35 before being wound upon a spool 20. If desired, further coating stages may be introduced at the position indicated at 5.

Figure 3:
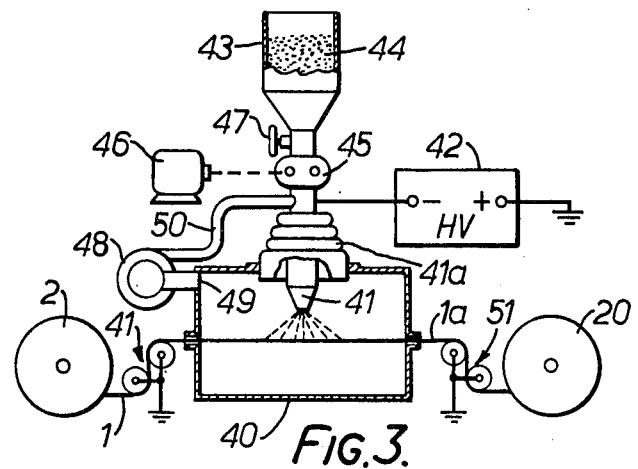
FIG. 3 is a schematic diagram illustrating another embodiment of apparatus for carrying out the invention.

In another embodiment of the invention which will now be described with reference to FIG. 3 of the drawing, a metal wick 1 which is to be flux coated is fed from a feed spool 2 into an enclosure 40. Wick 1 passes over grounded rollers 41 whereby it is held at ground potential. Enclosure 40 contains a distributor device 41 arranged to be held at an electrical potential differing by some thousands of volts (conveniently 5000–50,000 v) from ground potential to this end, dispersing device 41 may be connected to the negative terminal of a high-voltage source 42, the positive terminal of which is grounded. A hopper 43 contains a supply of coarsely particulate solid fluxing material 44 which passes from the hopper 43 into a known comminuting device 45 driven by an electric motor 46 or otherwise as may be preferred. Comminuting device 45 preferably reduces the solid fluxing material, supplied to it from hopper 43 at a rate controlled by a known flow control means indicated at 47, to an impalpable powder which is fed to distributor 41. Advantageously the comminuted particles have a size in the range of 0.5 to 100 microns. Although any known powder-dispersing arrangement may be employed it is preferred to use an air blast to entrain the powder delivered by comminuting device 45 and ensure its proper delivery into the enclosure 40. To this end an electrically-driven centrifugal blower 48 is arranged to withdraw air from enclosure 40 by way of an exit conduit 49 and to deliver air to distributor device 41, through a delivery conduit 50. It will be understood that distributor device 41 is insulated from enclosure 40 by an insulator 41a and that delivery conduit 50 will be made of insulating material, so as to allow device 41 to be held at a potential appropriately different from that of wick 1.

The difference in potential between wick 1 and the powdered fluxing material delivered by distributor 41 into enclosure 40 causes the bulk of the powder to become adherently coated upon the metal strands of the wick. On leaving enclosure 40, the coated wick 1a passes over grounded rollers 51 and is wound upon a take-up spool 20, preferably driven as described with reference to FIG. 1.

As in the preceding embodiments, the use of the described apparatus yields a metal wick coated with an adherent coating of fluxing material.

It will be understood that the invention is defined by the appended claims and is not to be taken as limited by the details of the above-described embodiments.

What is claimed is:

1. Apparatus for coating a metal wick with an adherent coating of a fluxing material, comprising
   (a) means (3) defining an enclosed chamber;
   (b) means (8) for maintaining a reducing atmosphere in said chamber;
   (c) means (2, 20) for progressively passing the wick through the chamber;
   (d) means (4) within the chamber for heating the wick to deoxidize the same;
   (e) means (10) for wetting the deoxidized wick with a solution of the fluxing material in a volatile solvent; and
   (f) means for evaporating the solvent from the wick to leave an adherent coating of the fluxing material on the wick, said evaporating means including means (15) defining an enclosure through which the wetted wick is transported, and means (17) for evacuating the enclosure to a subatmospheric pressure at room temperature, whereby the solvent will evaporate at room temperature at a speed that does not impair the continuity of the flux coating.

2. Apparatus as defined in claim 1, and further including
   (g) means for rewetting the coated wick with a further solution of fluxing material in a volatile solvent, and
   (h) means for evaporating at room temperature the solvent of said further solution to leave a further adherent coating of fluxing material on the wick.

* * * * *